Oct. 8, 1940.  F. E. MUNSCHAUER  2,217,596
CONTROL MECHANISM FOR MACHINES
Filed Nov. 16, 1938  2 Sheets-Sheet 1
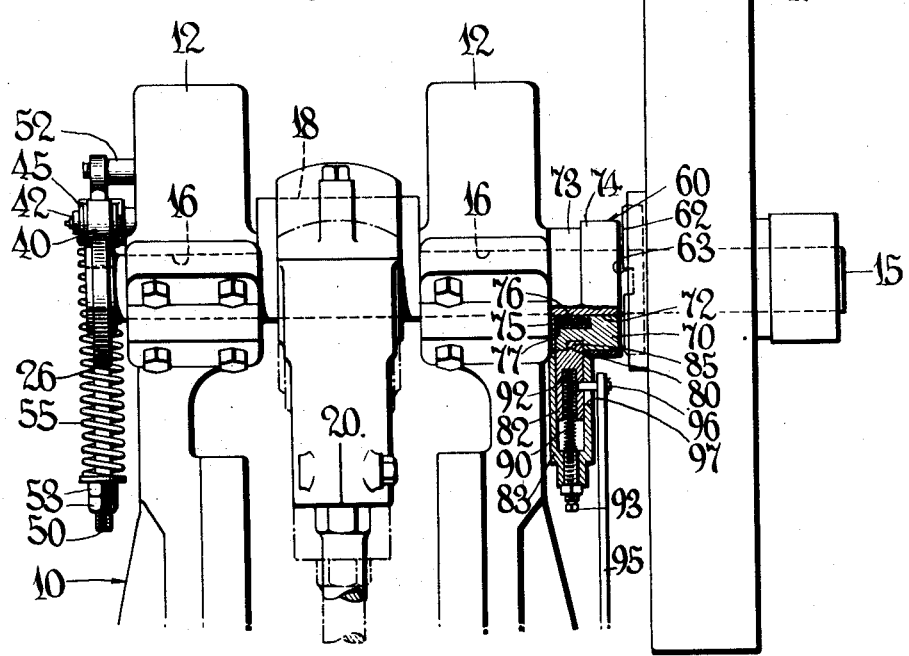
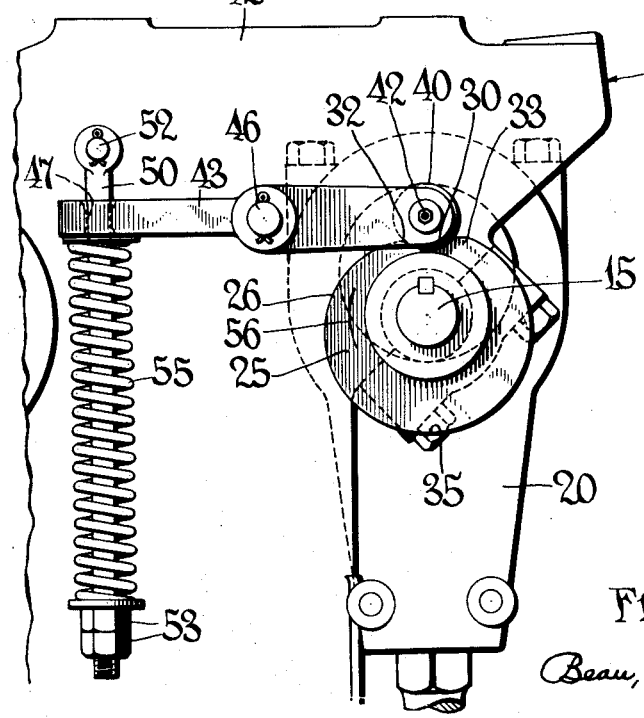
INVENTOR
Frederick E. Munschauer,
BY
Bean, Brooks, Buckley & Bean.
ATTORNEYS Oct. 8, 1940.    F. E. MUNSCHAUER    2,217,596
CONTROL MECHANISM FOR MACHINES
Filed Nov. 16, 1938     2 Sheets-Sheet 2
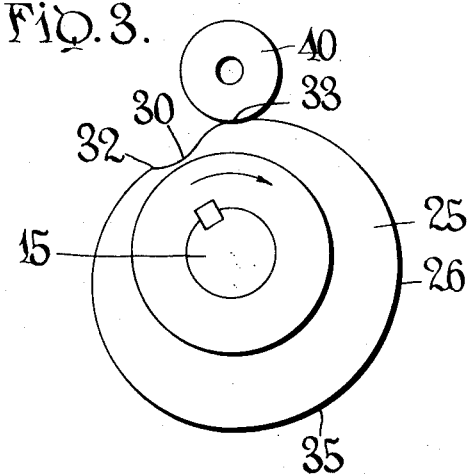
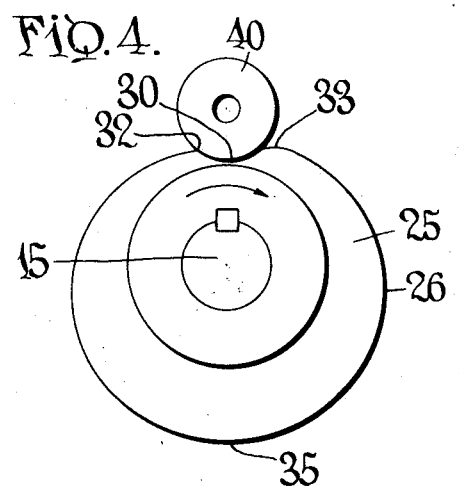
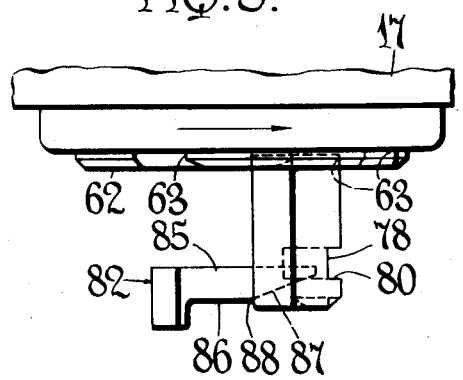
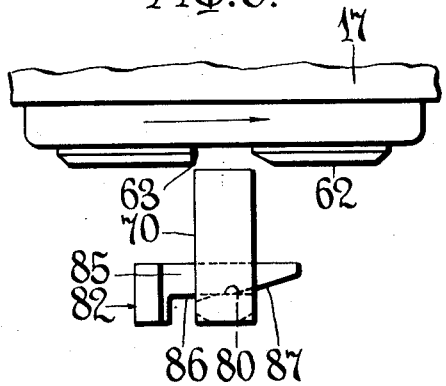
INVENTOR
Frederick E. Munschauer,
BY
Beau, Brooks, Buckley & Beau.
ATTORNEYS Patented Oct. 8, 1940

2,217,596

UNITED STATES PATENT OFFICE 2,217,596

CONTROL MECHANISM FOR MACHINES

Frederick E. Munschauer, Buffalo, N. Y., assignor to Niagara Machine and Tool Works, Buffalo, N. Y.

Application November 16, 1938, Serial No. 240,766

13 Claims. (Cl. 74—592)

This invention relates to machines for shearing, working or forming materials such as metal, or the like, and it has particular relation to control and counterbalancing structure adapted to be incorporated in machines of this kind.

One object of the invention is to provide an improved stop and counterbalancing mechanism adapted to function in various types of reciprocating machines.

Another object of the invention is to provide an improved mechanism to repeatedly stop operating parts of a machine at the same position in the cycle of operation.

Another object of the invention is to provide a counterbalancing mechanism which will drive rotary parts of a machine at the time of clutch disengagement to reduce effort, friction and wear on sliding clutch parts during the clutch disengagement.

Another object of the invention is to provide an improved stop and counterbalancing mechanism adapted to be used in conjunction with a crank shaft driven through a clutch, wherein the counterbalancing mechanism imparts driving force to insure that the shaft shall be rotated appreciably beyond the position of clutch disengagement approximately to its stop position, and the stop mechanism operates to arrest the shaft always approximately at its stop position.

Another object of the invention is to provide an improved stop and counterbalancing mechanism adapted to operate efficiently and without requiring adjustments regardless of whether the machine is heated or cold, and regardless of variables in friction, speed, or weight of dies or tools used therewith.

Another object of the invention is to provide a counterbalancing mechanism having different portions designed according to different positions of a crank shaft with which it is combined to distribute the counterbalancing action uniformly and insure maximum efficiency in operation.

Another object of the invention is to provide a stop and counterbalancing mechanism operable in cooperation with a one revolution clutch mechanism to drive a crank shaft, with which it is used, beyond clicking stage of the clutch mechanism regardless of the inclination of the machine or the speed of operation.

Another object of the invention is to provide a control mechanism operable in cooperation with a reciprocating machine to insure proper engagement of clutch mechanism included in the machine and to reduce friction in the working parts to a minimum.

The improved type of counterbalance and stop constructed according to the disclosure herein presented is applicable most effectively to the several types of inclinable and straight sided presses, as well as to shears and to other machines of a related nature. One application of the invention is exemplified in the connection of a cam track to the drive shaft and a yieldable means engageable with and exerting pressure upon the cam track. The track is provided with means which serves as a stop upon engagement of the yieldable means therewith. The cam can be so designed that the yieldable means resists rotation of the shaft, as the ram or reciprocable member of the machine approaches work engaging position, to compensate for weight of the reciprocating parts. On the other hand, another portion of the cam track is so designed that the yieldable means decreases its resistance to rotation of the shaft, and even provides a driving action when the reciprocable parts of the machine are being returned to a position for beginning another cycle of operation. Also, one revolution clutch mechanism is included in the drive connection from a source of power and is so synchronized with the operation of the stop and counterbalancing elements that the shaft is stopped after the disengagement of the clutch. The cam track is so designed that the driving action of the counterbalancing mechanism is accentuated at the time of clutch disengagement in order to insure rotation of the shaft beyond the clutch disengaging position and the stop then brings the shaft to rest at the position desired. The counterbalancing and arresting phases of the construction are the same regardless of the position of the machine in which it is installed, and regardless of temperature conditions of the working elements of the machinery. For convenience, the improved construction can be termed a detent stop mechanism.

In the drawings:

Fig. 1 is a fragmentary front elevation of a machine in which the invention has been incorporated;

Fig. 2 is a fragmentary side elevation, on a larger scale, of a counterbalancing shaft arresting mechanism;

Fig. 3 is a diagrammatic side elevation, on a larger scale, of cam and roller members in a position immediately prior to arresting the rotation of the shaft;

Fig. 4 is a diagrammatic side elevation similar to Fig. 3 and in which the cam and roller members are in such position as to resist rotation of the shaft;

Fig. 5 is a fragmentary plan of a one revolution clutch mechanism which is shown in an engaged relation; and Fig. 6 is a fragmentary plan similar to Fig. 5 and in which the clutch mechanism is shown in disengaged relation.

Referring to Fig. 1, a machine frame 10 is provided with bearing standards 12 in which a driven crank shaft or eccentric shaft 15 is journaled, as indicated at 16, in substantially horizontal relation and is provided adjacent one end with a power transmission wheel 17 to which power from a suitable source (not shown) is applied for rotating the shaft. The wheel 17 also serves as a flywheel.

An eccentric 18, which constitutes a crank member, is provided upon the shaft between the standards 12, and a pitman 20 reciprocable in forward and backward strokes provides a work engaging member operable in a conventional manner. That is, as viewed in Fig. 1, when the pitman 20 is in an upper position shown in full lines the work engaging member is at the limit of its backward stroke, and when it is in the lower position shown in broken lines of this figure the work engaging member is at the bottom or limit of its forward stroke.

An outer end of the shaft 15 has rigidly secured thereto a cam 25 in the form of a disk or plate which has a peripheral cam track 26 disposed circumferentially but eccentrically about the shaft. A depression 30 formed in the periphery of the cam track terminates approximately in crests 32 and 33 disposed at substantially opposite extremities of the depression. It should be noted that the crest 32 rises more abruptly from the depression than the crest 33, and that the latter crest is disposed upon a higher peripheral portion of the cam track. Higher and lower portions of the cam track are intended to indicate farther and nearer portions with reference to the radial distance from the axis of the shaft 15 which carries the cam track.

The cam track 26 is provided with a higher location or area 35 which is disposed substantially diametrically opposite the depression 30. The high area 35 rises a greater distance from the axis of the shaft than either of the crests 32 or 33. By following the course of the cam track in a counterclockwise direction (Figs. 3 and 4), it will be observed that the track contour rises progressively from the crest 32 to the higher area 35. Likewise, by following the course of the cam track in a clockwise direction, it will be observed that the contour of the cam track rises progressively from the crest 33 to the high area 35.

A roller 40 carried rotatably, as indicated at 42, upon an end portion of a lever 43 contacts the cam track and is prevented from accidental displacement therefrom in lateral directions by means of flanges 45. The roller is thus in the form of a grooved sheave by virtue of these flanges and, together with the lever 43, serves as a detent.

A pin 46 carried by the body of the machine pivotally supports the lever 43 intermediate its ends and the outer end of this lever is provided with an opening 47 through which the arm 50 is slidably disposed. One end of the arm is pivotally supported upon a pin 52 anchored in the body of the machine and the other or lower end of the arm is provided with nuts 53 adjustably threaded thereon. A suitable, yieldable member 55 in the form of a coil spring which is disposed about the arm 50 is confined under compression between the outer end of the lever 43 and the upper nut 53.

Since the spring 55 is under compression it urges the roller 40 yieldably under the influence of considerable force against the periphery of the cam track 26. In response to movement of the cam from the position shown in Fig. 2, wherein the roller 40 is disposed in the depression 30, the spring must be compressed as the roller rides up and out of the depression upon the crest 32. Likewise, the spring 55 is continuously and progressively compressed and offers progressively increasing resistance as the roller 40 rides up the rising portion of the cam track to the high area 35. It is to be understood that the shaft 15 normally rotates in the direction indicated by the arrow 56 shown in Fig. 2.

As the shaft 15 continues to rotate the cam track 26 in the direction indicated, the roller 40 rides down upon the portion of the track from the area 35 to the crest 33 and the spring operates in response to movement of the cam track against the roller to offer progressively decreasing resistance to the rotation of the shaft. In fact, this operation actually provides an appreciable driving force to the shaft as a result of the action of the pressure operated roller in running, in effect, down an incline. During the working portion of the cycle of operation of the shaft, energy is taken from the flywheel, decreasing its speed, which energy and speed must be replaced or compensated for during the remainder of the shaft revolution.

As the crest 33 on the cam track passes the roller 40 additional impetus to the shaft rotation is effected and after the roller enters the depression 30 the crest 32 abruptly offers resistance to further rotation.

Driving power is transmitted to the wheel 17 through a clutch mechanism 60 of any suitable construction; for example, the type described in United States Patent No. 1,752,843, issued to Paul R. Hahneman on April 1, 1930. This mechanism includes a clutch face 62 having radial grooves 63 therein and the face 62 is formed upon the inner side of the flywheel 17. A clutch pin 70 (Figs. 1, 5 and 6) is slidable axially of the shaft in a slot 72 that is formed in a circular collar 73 rigidly mounted eccentrically upon the shaft 15. A band 74 secured about the collar prevents the clutch pin from being displaced radially. A conventional coil spring 75 normally under compression is disposed in a socket 76 provided in the inner end of the pin and rests under compression against an abutment 77 defining the rear extremity of the slot in the collar. The pin 70 has a transversely disposed recess or notch 78 formed therein which provides an outwardly facing shoulder 80 adjacent the rear end portion thereof.

A clutch engaging slide 82 is vertically slidable in a guide 83 that is rigidly mounted upon the machine frame and the upper portion of the slide is provided with a substantially vertical flange 85 having a surface 86 (Fig. 5) which is disposed in a substantially vertical plane extending transversely of the axis of the shaft 15. The flange of the slide is also formed with an inclined cam surface 87 which is in a substantially vertical plane but is disposed at an angle to the surface 86. A corner 88 divides the surfaces 86 and 87 and the surface 86 normally engages the shoulder 80 of the clutch pin 70. A coil spring 90 installed under compression has one end thereof resting in a socket 92 formed in the lower portion of the slide 82 and the other end of the spring is anchored upon an upper end portion of a bolt 93 which is threaded adjustably and vertically in a lower wall of the guide for purposes of varying the spring compression. An actuating member 95 is pivotally attached to a pin 96 mounted in the side of the guide and the pin is vertically slidable in an opening 97 formed in the wall of the guide. The opening 97 limits the degree of vertical movement of the slide 82 in the guide 83.

By moving the actuating member 95 downwardly the surface 86 of the flange 85 is drawn out of contact with the shoulder 80 and the spring 75 automatically operates the clutch pin 70 into clutching engagement with the grooved face 62. This action establishes driving connection between the wheel 17 and the shaft 15. If the actuating member 95 is held at its lower position the shaft and clutch will continue to rotate. However, as soon as the actuating member is released the spring 90 actuates the slide 82 upwardly into such position that the cam surface 87 of the flange 85 is disposed in the path of the clutch pin and shoulder 80. The inclined cam surface 87, at substantially the conclusion of one revolution of the shaft and clutch, is then engaged by the shoulder 80, and as this shoulder rides upon the surface 87, the clutch pin 70 is withdrawn from the grooved face 62. This action discontinues driving connection from the pulley to the shaft 15 and the clutch pin is held out of engagement with the grooved face by virtue of the shoulder resting against the surface 86. Thus these elements operate as a one revolution clutch which functions automatically by tripping the member 95.

The operation of the clutch mechanism and cam track 26, with its lever 80, is so synchronized that, at the time the clutch pin is disengaged from the grooved face 62, the roller 40 is approaching or rolling over the crest 33 of the cam track to enter the depression 30. Thus, by releasing the clutch pin 70 the rotation of the shaft 15 is driven forward a few degrees by the counterbalancing mechanism and is then arrested by the engagement of the roller in the depression 30; more particularly, by engagement of the roller with the inclined wall portion of the depression defining the crest 32.

Although the cam track 26 and roller carrying members are, for the sake of convenience, disposed in such position that the cam depression 30 is at the top of the shaft at the time the pitman is at the top of its stroke or in its inoperative position, it is apparent that the cam track 26 and roller 40 are adapted to be positioned at any other position about the shaft so long as the timing is such that the roller engages in the depression substantially at the time of clutch disengagement, or at the time the pitman completes its stroke or is returned to its inactive position.

In the operation of the structure described, when the clutch mechanism is engaged, the shaft 15 rotates in the direction indicated by the arrow 56 (Fig. 2) and the roller 40 is raised quite abruptly from the bottom of the cam depression 30 up to the crest 32. This action compresses the spring 55 and therefore provides for greater pressure of the roller upon the cam track. As the shaft 15 continues to rotate, the cam track continues to raise the roller, at the same time increasing the compression of the spring 55, therefore offering progressively increasing resistance to rotation of the shaft. The resistance to compression of this spring serves to counterbalance the machine parts and prevents the shaft from rotating ahead of the clutch mechanism. Otherwise the weight of the reciprocating parts of the machine would tend to cause rotation of the shaft ahead of the clutch mechanism. At the bottom of the stroke of the reciprocating pitman 20, the high area 35 of the cam track is contacting the roller 40; that is, it is directly under this roller. Therefore, the energy of the spring 55 acting through the roller is capable of exerting forces tending to rotate the shaft in either direction if the rotation of the shaft were initiated in either direction when the high area 35 is in this position directly under the roller 40. However, at this stage of the operation of the machine, no counterbalancing action is required, and in fact no counterbalancing action is required during the up stroke, that is, during travel of the pitman from its bottom or forward work engaging position to its rearward limit of movement, because the flywheel and clutch mechanism must drive during this portion of the stroke. Because of this operation, the rotation of the cam track from its position of contact of the roller 40 with the high area 35 to the position of contact of the roller with the crest 33 is somewhat slower than the rotation of the cam track from its position of contact of the roller with the crest 32 to the position of contact of the roller with the high area 35. When the roller approaches the crest 33, that is, when the pitman approaches the end of its stroke, disengagement of the clutch pin 70 from the grooved face 62 is initiated. At this portion of the stroke the cam and roller mechanism imparts driving force to the shaft, thereby reducing the pressure between the driving surfaces of the flywheel and clutch pin and thus reducing the effort necessary to withdraw the clutch pin. This action reduces wear and simplifies the operation.

In my improved mechanism, the roller will have passed the cam crest 33 at the time the driving connection between the shaft and flywheel has been broken. The greatly increased pitch of the cam track upon entering the depression 30 provides a driving force to the shaft to further withdraw the clutch pin and to eliminate any partial engagement between the driving parts. When the cam roller reaches the bottom of the depression 30, the abrupt, oppositely disposed inclines defining the depression are then disposed on either side of the roller to prevent rotation of the shaft in either direction. Since the counterbalancing spring and roller continue to drive instead of applying braking force during the phases of operation immediately preceding and following the disengagement of the clutch pin 70, the clutch elements will not be subjected to objectionable clicking noises and complete disengagement is effected in such manner as to retard wearing action on the clutch elements. In other words, the pressure roller 40 and cam track 26 not only substantially eliminate friction during clutch disengagement, but also provide driving action to assist the inertia of moving parts. Therefore, it will be apparent that it is only necessary to set the tension of the spring 55 properly for existing conditions of operation in any machine to secure satisfactory and correct operation of the clutch and other elements of the controls associated therewith.

Although only one form of the invention has been shown and described in detail, it will be apparent to those skilled in the art that the invention is not so limited, but that various changes can be made therein without departing from the spirit of the invention or from the scope of the appended claims.

I claim:

1. In a metal working machine of the reciprocating type, engaging counterbalancing cam and cam follower members one of which is rotatable relative to the other, driving means for relatively rotating the members, an element reciprocable forwardly and backwardly and having means connecting it to one of said members, said members having engageable portions restraining relative rotation thereof in the forward reciprocation of said element, said members having other engageable portions operable to increase the driving force relatively rotating the members in the backward reciprocation of said element, said members having detent stop mechanism including parts repeatedly engageable and releasable during cycles of relative rotation of said members to releasably stop the latter during the interval of engagement of said other portions.

2. In a metal fabricating machine of the type comprising a reciprocable slide, motion controlling means comprising a cam track and a follower therefor, one of said elements being movable responsive to movements of said slide, resilient means adapted to be successively stressed and released by relative movement between said cam track and said follower, said slide being reciprocable in such fashion that in one direction of movement the force of gravity assists its movement while in its opposite direction of movement the force of gravity deters its movement, said cam track having inclined portions for stressing said resilient means when the force of gravity is assisting movement of the slide and other inclined portions for releasing said resilient means when the force of gravity is deterring such movement, whereby the effect of the force of gravity is counteracted by the successive stressing and releasing of said resilient means, and a depression in said cam track engageable by said follower when the slide is in a predetermined position for arresting said slide in such position.

3. In a metal fabricating machine of the type comprising a reciprocable slide, motion controlling means comprising a cam track and a follower therefor, one of said elements being movable responsive to movements of said slide, resilient means adapted to be successively stressed and released by relative movement between said cam track and said follower, said slide being reciprocable in such fashion that in one direction of movement the force of gravity assists its movement while in its opposite direction of movement the force of gravity deters its movement, said cam track having inclined portions for stressing said resilient means when the force of gravity is assisting movement of the slide and other inclined portions for releasing said resilient means when the force of gravity is deterring such movement, whereby the effect of the force of gravity is counteracted by the successive stressing and releasing of said resilient means, one of said elements being connected with said slide for driving movement therewith, clutch means operable to impart to said slide automatically a single cycle of reciprocation, and a depression in said cam track engageable by said follower when the end of a cycle of reciprocation is reached to insure stopping of said slide in a predetermined position.

4. In a metal fabricating machine of the type comprising a reciprocable slide and a crank shaft for effecting reciprocation thereof, a cam secured to said crank shaft for rotation therewith, a follower engageable with the cam track of said cam and means resiliently urging said follower into resilient engagement with said cam, said cam track being formed to substantially continuously load said resilient means throughout the major portion of the reciprocation of the slide in one direction and substantially continuously unload said resilient means throughout the major portion of the reciprocation of the slide in the other direction, whereby to counterbalance forces tending to bias said slide toward one of its extreme positions, and a depression in said cam track and engageable by said follower when the normal position of rest of said slide is reached to insure stoppage of said slide at such point.

5. In a metal fabricating machine of the type comprising a reciprocable slide and a crank shaft for effecting reciprocation thereof, driving means for said crank shaft, clutch means for establishing a positive driving interlock between said driving means and said crank shaft, manual means for rendering said clutch means effective, said last mentioned means being adapted to automatically disengage said clutch in a given region of the cycle of movement of said crank shaft after manual engagement thereof, and other means for arresting movement of said crank shaft and said slide at a predetermined point after disengagement of said clutch, said other means comprising a cam, a follower, and resilient means for maintaining engagement between said cam and said follower, said cam having a depression engageable by said follower to resist overrunning of said crank shaft and thereby arrest said crank shaft at its predetermined point of stoppage.

6. In a metal fabricating machine of the type comprising a reciprocable slide and a crank shaft for effecting reciprocation thereof, driving means for said crank shaft, clutch means for establishing a positive driving interlock between said driving means and said crank shaft, manual means for rendering said clutch means effective, said means being adapted to automatically disengage said clutch in a given region of the cycle of movement of said crank shaft after manual engagement thereof, and other means for arresting movement of said crank shaft and said slide at a predetermined point, said other means comprising a cam, a follower therefor, and resilient means for maintaining engagement between said cam and said follower, said cam having a depressed portion in its contour engageable by said follower to resist overrunning of said crank shaft and thereby arrest said crank shaft at its predetermined position after disengagement of said clutch, and the portion of said cam traversed by said follower just prior to said depressed portion being inclined to cooperate with the resiliently urged follower to impart driving movement to said crank shaft independently of its driving means to permit free disengagement of said clutch means.

7. In a metal fabricating machine of the type comprising a reciprocable slide and a drive shaft for effecting reciprocation thereof, a cam secured to said drive shaft, a follower engageable with the cam track of said cam and means resiliently urging said follower into resilient engagement with said cam, said cam track being formed to substantially continuously load said resilient means throughout the major portion of the reciprocation of the slide in one direction and substantially continuously unload said resilient means throughout the major portion of the reciprocation of the slide in the other direction, and a depression in said cam track and engageable by said follower when the normal position of rest of said slide is reached to insure stoppage of said slide at such point.

8. In a metal fabricating machine of the type comprising a reciprocable slide and a drive shaft for effecting reciprocation thereof, means for actuating said drive shaft, a cam secured to said drive shaft, a follower engageable with the cam track of said cam and means resiliently urging said follower into resilient engagement with said cam, said cam track being formed to substantially continuously load said resilient means throughout the major portion of the reciprocation of the slide in one direction and substantially continuously unload said resilient means throughout the major portion of the reciprocation of the slide in the other direction, clutch means engageable and disengageable to render said reciprocable slide and said cam jointly operative and inoperative, and a depression in said cam track and engageable by said follower when the normal position of rest of said slide is reached to insure stoppage of said slide at such point, the portion of said cam traversed by said follower just prior to said depressed portion being inclined to cooperate with the resiliently urged follower to impart driving movement to said drive shaft independently of its actuating means to permit free disengagement of said clutch means.

9. In a metal fabricating machine of the type comprising a reciprocable slide, motion controlling means comprising a cam track and a follower therefor, one of said elements being movable responsive to movements of said slide, resilient means adapted to be successively stressed and released by relative movement between said cam track and said follower, said slide being reciprocable in such fashion that in one direction of movement the force of gravity assists its movement while in its opposite direction of movement the force of gravity deters its movement, said cam track having inclined portions for stressing said resilient means when the force of gravity is assisting movement of the slide and other inclined portions for releasing said resilient means when the force of gravity is deterring such movement, whereby the effect of the force of gravity is counteracted by the successive stressing and releasing of said resilient means, clutch means engageable and disengageable to render said slide operative and inoperative, and a depression in said cam track engageable by said follower when the slide is in a predetermined position for arresting said slide in such position, the portion of said cam traversed by said follower just prior to said depression being inclined to impart driving movement to said reciprocable slide during the period when said clutch means is being disengaged.

10. In a metal fabricating machine of the type comprising a reciprocable slide and a crank shaft for effecting reciprocation thereof, driving means for said crank shaft, clutch means for establishing a positive driving interlock between said driving means and said crank shaft, manual means for rendering said clutch means effective, said means being adapted to automatically disengage said clutch in a given region of the cycle of movement of said crank shaft after manual engagement thereof, and other means for arresting movement of said crank shaft and said slide at a predetermined point, said other means comprising a cam, a follower therefor, and resilient means for maintaining engagement between said cam and said follower, said cam having a depressed portion in its contour engageable by said follower to resist overrunning of said crank shaft and thereby arrest said crank shaft at its predetermined position after disengagement of said clutch, and the portion of said cam traversed by said follower just prior to said depressed portion being inclined to cooperate with the resiliently urged follower to impart driving movement to said crank shaft independently of its driving means during clutch disengagement and thereafter until the disengaged clutch parts are moved substantially beyond their immediate point of disengagement.

11. In a metal fabricating machine of the type comprising a reciprocable slide and a crank shaft for effecting reciprocation thereof, driving means for said crank shaft, clutch means for establishing a positive driving interlock between said driving means and said crank shaft, means for manually rendering said clutch means effective and for automatically disengaging said clutch in a given region of the cycle of movement of said crank shaft after manual engagement, a cam and a follower resiliently in engagement therewith, said cam and follower being relatively movable in response to movement of said reciprocable slide, said cam having an inclined portion adapted to cooperate with said follower to impart independent driving movement to said reciprocable slide during the clutch disengaging operation to permit free disengagement of said clutch means, said inclined portion terminating in a depression for cooperating with said follower to insure stoppage of said slide at a predetermined point in its cycle of movement.

12. In a metal fabricating machine of the type comprising a reciprocable slide and drive means therefor, clutch means engageable and disengageable to render said slide operative and inoperative, motion controlling means comprising a cam track and a follower therefor, one of said elements being movable responsive to movements of said slide, and resilient means adapted to be successively stressed and released by relative movement between said cam track and said follower, said cam track having an inclined portion adapted to cooperate with said follower and said resilient means to impart independent driving movement to said reciprocable slide during clutch disengaging operation to permit free disengagement of said clutch means, said inclined portion terminating in a depression for cooperating with said follower to insure stoppage of said slide at a predetermined point in its cycle of movement.

13. In a metal fabricating machine of the type comprising a reciprocable slide and drive means therefor, clutch means manually operable to render said slide operative, automatic means moving with said slide for disengaging said clutch means at a predetermined point after manual engagement thereof, motion controlling means comprising a cam track and a follower therefor, one of said elements being movable responsive to movements of said slide, and resilient means adapted to be successively stressed and released by relative movement between said cam track and said follower, said cam track having an inclined portion adapted to cooperate with said follower and said resilient means to impart independent driving movement to said reciprocable slide during clutch disengagement and thereafter until the disengaged clutch parts are moved substantially beyond their immediate point of disengagement to permit free disengagement of said clutch means, said inclined portion terminating in a depression for cooperating with said follower to insure stoppage of said slide at a predetermined point in its cycle of movement.

FREDERICK E. MUNSCHAUER.